(12) United States Patent
Ichihara et al.

(10) Patent No.: US 8,514,600 B1
(45) Date of Patent: Aug. 20, 2013

(54) POWER CONVERSION APPARATUS WITH ZERO CURRENT CROSSING DIRECTION CORRECTION

(75) Inventors: Masafumi Ichihara, Chiyoda-ku (JP); Hiroyuki Uchida, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/814,998

(22) PCT Filed: Apr. 11, 2012

(86) PCT No.: PCT/JP2012/059920
§ 371 (c)(1),
(2), (4) Date: Feb. 8, 2013

(51) Int. Cl.
*H02M 7/797* (2006.01)

(52) U.S. Cl.
USPC .......................................................... 363/98

(58) Field of Classification Search
USPC ............................................ 363/95, 98, 132
See application file for complete search history.

(56) References Cited

U.S. PATENT DOCUMENTS

| | | | |
|---|---|---|---|
| 2009/0067205 A1* | 3/2009 | Oyobe et al. | 363/98 |
| 2009/0309528 A1 | 12/2009 | Hanada et al. | |
| 2009/0310390 A1* | 12/2009 | Ohshima et al. | 363/71 |

FOREIGN PATENT DOCUMENTS

| | | |
|---|---|---|
| JP | 63-274398 A | 11/1988 |
| JP | 2001-078494 A | 3/2001 |
| JP | 2004-312930 A | 11/2004 |
| JP | 2006-258745 A | 9/2006 |
| JP | 2007-069836 A | 3/2007 |
| JP | 2007-159348 A | 6/2007 |
| JP | 2007-192723 A | 8/2007 |
| JP | 2009-303283 A | 12/2009 |

OTHER PUBLICATIONS

International Search Report of PCT/JP2012/059920 dated Jul. 10, 2012.

* cited by examiner

*Primary Examiner* — Jeffrey Sterrett
(74) *Attorney, Agent, or Firm* — Sughrue Mion, PLLC

(57) ABSTRACT

A power conversion apparatus includes a current sensor that detects a phase current flowing through a phase current line, a first phase-voltage detection unit that detects a first phase voltage in the phase current line with a potential in a P line as a reference, a second phase-voltage detection unit that detects a second phase voltage in the phase current line with a potential in an N line as a reference, an estimation unit that estimates a zero-cross point timing of the phase current based on magnitude and symbol of the first and second phase voltage, a calculation unit that obtains a correction value with respect to a detection value of the current sensor according to the detection value of the current sensor at the estimated zero-cross point timing, and a correction unit that corrects a detection value of the current sensor by using the obtained correction value.

8 Claims, 11 Drawing Sheets

REPLACEMENT DRAWING

TABLE RELATIONSHIP BETWEEN V1/V2 AND CURRENT DIRECTION

|  | CP1 | CP2 | CP3 | CP4 | CP5 | CP6 |
|---|---|---|---|---|---|---|
| V1 | -Va | -Vb | -Vb | Va | -Va | UNDETERMINED |
| V2 | Vb | -Va | Va | Vb | Va | UNDETERMINED |
| CURRENT DIRECTION | OUT | OUT | IN | IN | SHORT CIRCUIT | Io=0 |

(a)

(b)

(a)

| | | S22 | |
|---|---|---|---|
| | | H | L |
| S21 | H | IN | × |
| | L | OUT | UNDETER-MINED |

40

(b)

| | | S31 | |
|---|---|---|---|
| | | H | L |
| S32 | H | UNDETER-MINED | IN |
| | L | × | OUT |

40

(c)

| S21 | S22 | S31 | S32 | CURRENT DIRECTION |
|---|---|---|---|---|
| H | H | L | H | IN |
| H | H | H | H | IN |
| L | L | L | H | IN |
| L | H | L | L | OUT |
| L | L | L | L | OUT |
| L | H | H | H | OUT |
| L | H | L | H | SHORT CIRCUIT |

40

REPLACEMENT DRAWING

REPLACEMENT DRAWING

POWER CONVERSION APPARATUS WITH ZERO CURRENT CROSSING DIRECTION CORRECTION

CROSS REFERENCE TO RELATED APPLICATIONS

This application is a National Stage of International Application No. PCT/JP2012/059920 filed Apr. 11, 2012, the contents of all of which are incorporated herein by reference in their entirety.

FIELD

The present invention relates to a power conversion apparatus.

BACKGROUND

Conventionally, in a power conversion apparatus, a current is detected by a current sensor. The current sensor is known to have an offset.

Patent Literature 1 describes a motor drive system including a plurality of motors and a plurality of inverter circuits, in which when a control circuit determines in each of the inverter circuits that a current sensor is in a non-energized state, the control circuit samples measurement data of the current sensor in a non-energized state a predetermined number of times, and updates an offset value by using an average value of the sampled measurement data. Therefore, according to Patent Literature 1, a zero-point adjustment of the measurement data of the current sensor is performed by using the updated offset value at the time of operating the motor drive system. Accordingly, it is supposed that a zero-point adjustment of a current sensor corresponding to each of the inverter circuits can be performed with high accuracy by eliminating an influence of noise from other inverter circuits.

CITATION LIST

Patent Literature

Patent Literature 1: Japanese Patent Application Laid-open No. 2006-258745

SUMMARY

Technical Problem

In the technology described in Patent Literature 1, it is assumed that measurement data of a current sensor is sampled only when the current sensor is in a non-energized state, and a time period when it is possible to clearly determine that an output current is zero in an inverter is limited to a time when the inverter is stopped. However, there is a possibility that although an offset value (a correction value) is obtained at the time of stopping the inverter, an offset of the current sensor varies due to a temperature or the like during long-time continuous driving, and appropriate correction cannot be performed. If appropriate correction cannot be performed, it is difficult to accurately detect a phase current, and it is also difficult to accurately perform a control operation in a motor drive system (a power conversion apparatus) by using a detected phase current.

The present invention has been achieved to solve the above problems, and an object of the present invention is to provide a power conversion apparatus that can perform appropriate correction while continuing a driving operation.

Solution to Problem

In order to solve above-mentioned problems and achieve the object, there is provided a power conversion apparatus according to an aspect of the present invention, the power conversion apparatus including a current sensor that detects a phase current flowing through a phase current line; a first phase-voltage detection unit that detects a first phase voltage in the phase current line with a potential in a P line as a reference; a second phase-voltage detection unit that detects a second phase voltage in the phase current line with a potential in an N line as a reference; an estimation unit that estimates a zero-cross point timing of a phase current flowing through the phase current line based on a magnitude and a symbol of the first phase voltage and a magnitude and a symbol of the second phase voltage; a calculation unit that obtains a correction value with respect to a detection value of the current sensor according to a detection value of the current sensor at the estimated zero-cross point timing; and a correction unit that corrects a detection value of the current sensor by using the obtained correction value.

Advantageous Effects of Invention

According to the present invention, a correction value corresponding to an offset of a current sensor can be obtained as needed while continuing a driving operation. That is, appropriate correction can be performed while continuing a driving operation.

DESCRIPTION OF EMBODIMENTS

Exemplary embodiments of a power conversion apparatus according to the present invention will be explained below in detail with reference to the accompanying drawings. The present invention is not limited to the embodiments.

First Embodiment

Figure 1:
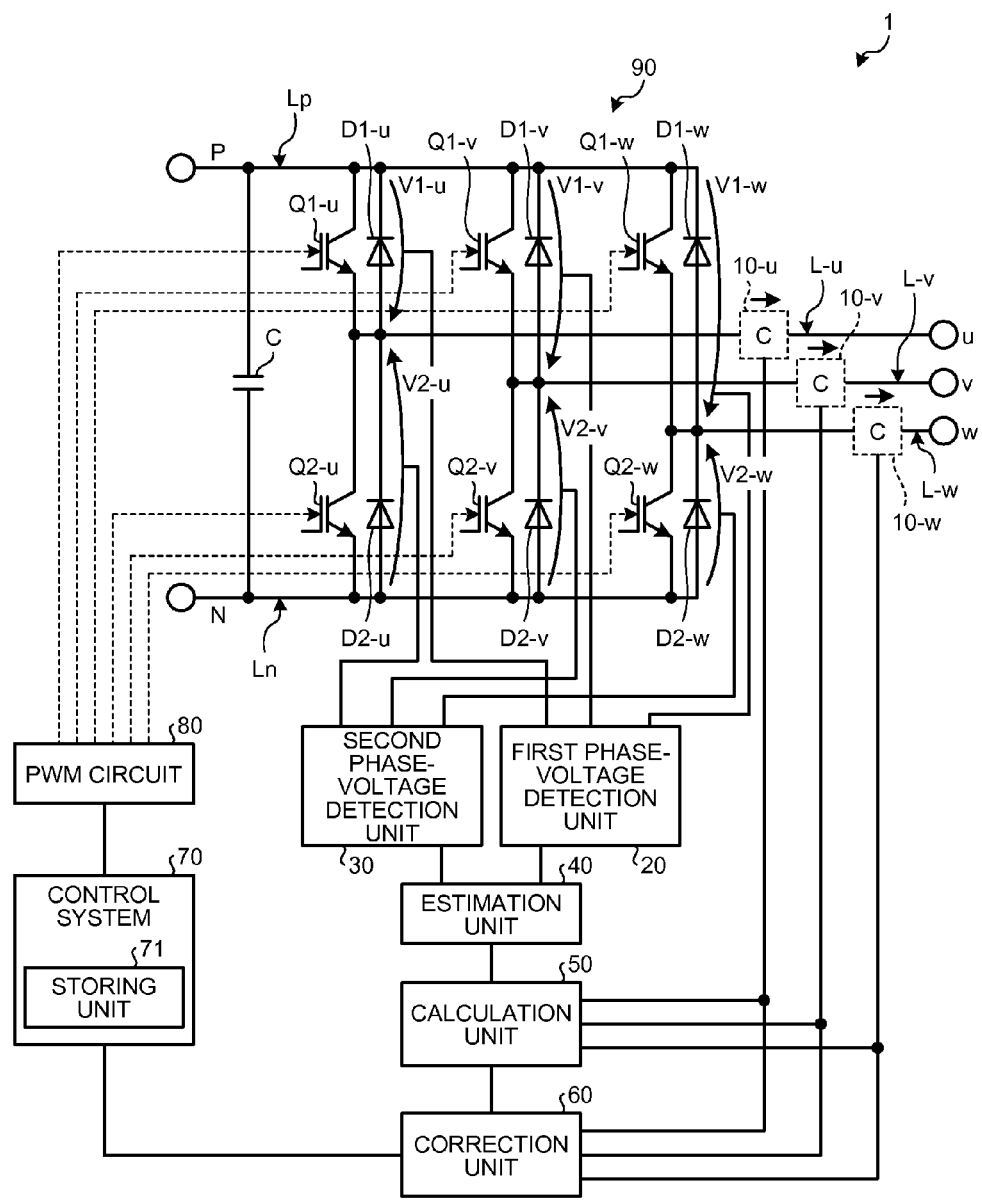
FIG. 1 depicts a configuration of a power conversion apparatus according to a first embodiment.

A power conversion apparatus 1 according to a first embodiment is explained with reference to FIG. 1. FIG. 1 depicts a configuration of the power conversion apparatus 1.

The power conversion apparatus 1 converts supplied power into another form of power, and outputs the converted power. For example, the power conversion apparatus 1 is an inverter, and converts supplied DC power into AC power and outputs the converted AC power to a predetermined control target (for example, a motor). As another example, the power conversion apparatus 1 is a converter, and converts supplied AC power into DC power and outputs the converted DC power to a predetermined control target (for example, an inverter). As still another example, the power conversion apparatus 1 is a boost chopper or a buck chopper, and converts supplied DC power into DC power at a different voltage level and outputs the converted DC power to a predetermined control target. A case where the power conversion apparatus 1 is an inverter is explained below as an example. However, the following explanations are also applicable to a case where the power conversion apparatus 1 is in another form, for example, a converter, a boost chopper, or a buck chopper.

As shown in FIG. 1, the power conversion apparatus 1 includes an inverter circuit 90, current sensors 10-*u*, 10-*v*, and 10-*w*, a first phase-voltage detection unit 20, a second phase-voltage detection unit 30, an estimation unit 40, a calculation unit 50, a correction unit 60, a control system 70, and a PWM circuit 80.

The inverter circuit 90 receives DC power through a P line Lp and an N line Ln that are bus bars. The DC power is supplied through terminals P and N and smoothed by a smoothing capacitor C. The inverter circuit 90 converts the received DC power into AC power.

Specifically, the inverter circuit 90 includes a plurality of switching elements Q1-*u*, Q1-*v*, Q1-*w*, Q2-*u*, Q2-*v*, and Q2-*w* and a plurality of freewheeling diodes D1-*u*, D1-*v*, D1-*w*, D2-*u*, D2-*v*, and D2-*w*. The switching elements Q1-*u*, Q1-*v*, and Q1-*w* constitute a plurality of switching elements of an upper arm. The switching elements Q2-*u*, Q2-*v*, and Q2-*w* constitute a plurality of switching elements of a lower arm. Each of the switching elements Q1-*u*, Q1-*v*, Q1-*w*, Q2-*u*, Q2-*v*, and Q2-*w* performs an on/off operation at a predetermined timing according to a PWM signal supplied from the PWM circuit 80. The switching elements Q1-*u* and Q2-*u* perform an on/off operation corresponding to a U-phase current. The switching elements Q1-*v* and Q2-*v* perform an on/off operation corresponding to a V-phase current. The switching elements Q1-*w* and Q2-*w* perform an on/off operation corresponding to a W-phase current. Accordingly, DC power is converted into AC power including the U-phase current, the V-phase current, and the W-phase current.

The inverter circuit 90 outputs the converted AC power to a control target (not shown) via a U-phase current line L-u, a V-phase current line L-v, and a W-phase current line L-w.

The current sensors 10-*u*, 10-*v*, and 10-*w* detect a U-phase current, a V-phase current, and a W-phase current that respectively flow through the U-phase current line L-u, the V-phase current line L-v, and the W-phase current line L-w. The current sensors 10-*u*, 10-*v*, and 10-*w* can be a sensor using a Hall element or a shunt resistance, for example. The current sensors 10-*u*, 10-*v*, and 10-*w* respectively supply detection values of the U-phase current, the V-phase current, and the W-phase current to the calculation unit 50 and the correction unit 60.

The first phase-voltage detection unit 20 detects a first phase voltage in a phase current line with a potential in the P line Lp as a reference. For example, the first phase-voltage detection unit 20 detects a first U-phase voltage V1-*u* in the U-phase current line L-u with a potential in the P line Lp as a reference. For example, the first phase-voltage detection unit 20 also detects other first phase voltages (a first V-phase voltage and a first W-phase voltage) in the same manner as described above. That is, the first phase-voltage detection unit 20 can detect each of a plurality of first phase voltages (a first U-phase voltage, a first V-phase voltage, and a first W-phase voltage) in parallel. The first phase-voltage detection unit 20 then supplies a detected result to the estimation unit 40.

The second phase-voltage detection unit 30 detects a second phase voltage in a phase current line with a potential in the N line Ln as a reference. For example, the second phase-voltage detection unit 30 detects a second U-phase voltage V2-*u* in the U-phase current line L-u with a potential in the N line Ln as a reference. For example, the second phase-voltage detection unit 30 also detects other second phase voltages (a second V-phase voltage and a second W-phase voltage) in the same manner as described above. That is, the second phase-voltage detection unit 30 can detect each of a plurality of second phase voltages (a second U-phase voltage, a second V-phase voltage, and a second W-phase voltage) in parallel. The second phase-voltage detection unit 30 then supplies a detected result to the estimation unit 40.

The estimation unit 40 receives a detection result of a first phase voltage from the first phase-voltage detection unit 20, and receives a detection result of a second phase voltage from the second phase-voltage detection unit 30. The estimation unit 40 specifies a magnitude and a symbol of the first phase voltage based on the detection result of the first phase voltage, and specifies a magnitude and a symbol of the second phase voltage based on the detection result of the second phase voltage. The estimation unit 40 estimates a zero-cross point timing of a phase current flowing through a phase current line based on the magnitude and symbol of the first phase voltage and the magnitude and symbol of the second phase voltage. For example, the estimation unit 40 estimates a zero-cross point timing of a U-phase current flowing through the U-phase current line L-u based on a magnitude and a symbol of the first phase voltage V1-*u* and a magnitude and a symbol of the second phase voltage V2-*u*. For example, the estimation unit 40 also estimates a zero-cross point timing of other phase currents (a V-phase current and a W-phase current) in the same manner as described above. That is, the estimation unit 40 can estimate a zero-cross point timing of each of a plurality of phase currents (a U-phase current, a V-phase current, and a W-phase current) in parallel.

Specifically, the estimation unit 40 estimates a direction of a phase current flowing through a phase current line based on a magnitude and a symbol of a first phase voltage and a magnitude and a symbol of a second phase voltage, and estimates a timing at which the estimated phase-current direction is reversed as a phase-current zero-cross point timing. The estimation unit 40 supplies a signal indicating the estimated zero-cross point timing (for example, a change detection signal) to the calculation unit 50.

The calculation unit 50 receives the signal indicating the estimated zero-cross point timing from the estimation unit 40, and receives detection values of a U-phase current, a V-phase current, and a W-phase current respectively from the current sensors 10-*u*, 10-*v*, and 10-*w*. The calculation unit 50 stores therein a detection value of a current sensor at a zero-cross point timing estimated by the estimation unit 40. For example, the calculation unit 50 stores therein a detection value of the current sensor 10-*u* at an estimated zero-cross point timing of a U-phase current, and uses the stored detection value to obtain a correction value with respect to the detection value of the U-phase current. For example, the calculation unit 50 also obtains a correction value with respect to a detection value of other phase currents (a V-phase current and a W-phase current) in the same manner as described above. That is, the calculation unit 50 can perform a process of obtaining a correction value with respect to a detection value of each of a plurality of phase currents (a U-phase current, a V-phase current, and a W-phase current) in parallel. The calculation unit 50 then supplies the obtained correction values to the correction unit 60.

The correction unit 60 receives the obtained correction values from the calculation unit 50, and receives detection values of a U-phase current, a V-phase current, and a W-phase current respectively from the current sensors 10-*u*, 10-*v*, and 10-*w*. The correction unit 60 uses each of the received correction values to correct a detection value of a current sensor. For example, the correction unit 60 uses a correction value of a U-phase current to correct a detection value of the current sensor 10-*u*. For example, the correction unit 60 also corrects detection values of other phase currents (a V-phase current and a W-phase current) in the same manner as described above. That is, the correction unit 60 can perform a process of correcting a detection value of each of a plurality of phase currents (a U-phase current, a V-phase current, and a W-phase current) in parallel. The correction unit 60 then supplies the corrected detection values of the phase currents to the control system 70.

The control system 70 receives the corrected detection values of the phase currents from the correction unit 60. That is, a storing unit 71 stores therein the corrected detection values of the phase currents. The control system 70 receives a predetermined command from a higher controller (not shown). The control system 70 performs a predetermined control operation according to the predetermined command based on the corrected detection values of the phase currents, and supplies a predetermined control signal to the PWM circuit 80.

The PWM circuit 80 receives the predetermined control signal from the control system 70. The PWM circuit 80 generates a PWM signal and supplies the PWM signal to the inverter circuit 90 according to the predetermined control signal.

In the above explanations, the suffixes "-u", "-v", and "-w" represent "U-phase", "V-phase", and "W-phase", respectively. In the following explanations, these suffixes are omitted, and while only the U-phase is explained as an example, explanations thereof are also applicable to other phases (the V-phase and the W-phase).

Figure 2:
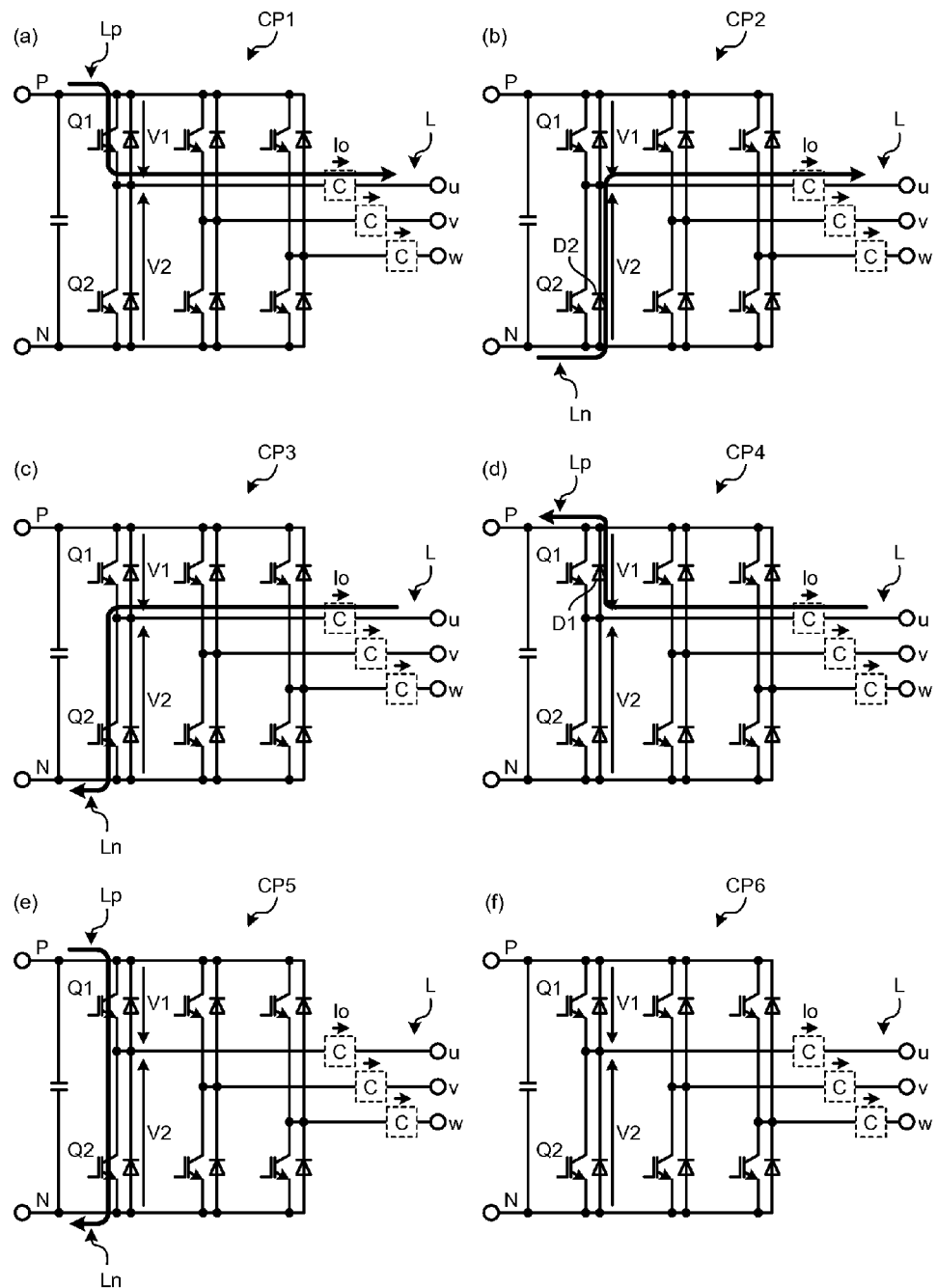
FIG. 2 depict current patterns in the power conversion apparatus according to the first embodiment.
Figures 3, 4:
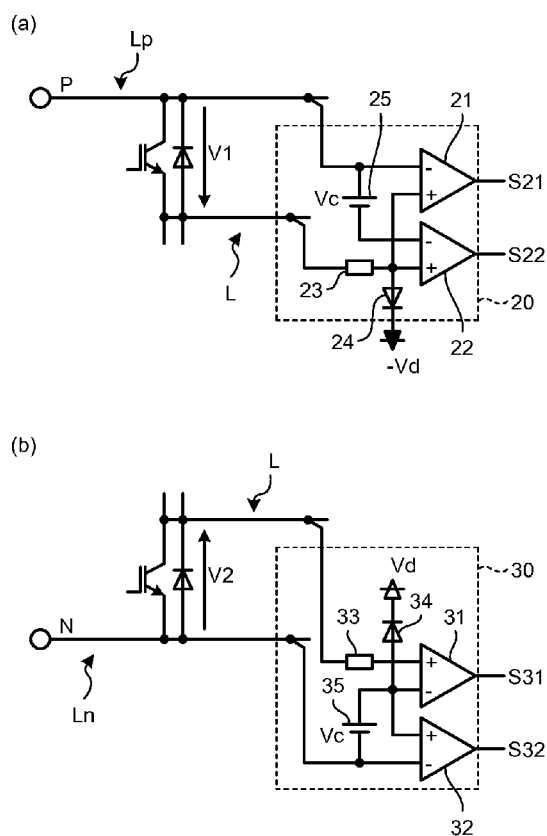
FIG. 3 depicts a relationship between current patterns and a current direction in the power conversion apparatus according to the first embodiment.
FIG. 4 depict configurations of a first phase-voltage detection unit and a second phase-voltage detection unit according to the first embodiment.

Estimation principles of a phase-current zero-cross point in the power conversion apparatus 1 are explained next with reference to FIG. 2 and FIG. 3. FIGS. 2(*a*) to 2(*f*) respectively depict mutually different current patterns. FIG. 3 depicts a relationship between each of a plurality of mutually different current patterns and a current direction.

In the power conversion apparatus 1 (see FIG. 1), a phase voltage relative to the potential in the P line Lp and a phase voltage relative to the potential in the N line Ln are referred to as "first phase voltage V1" and "second phase voltage V2", respectively. The first phase-voltage detection unit 20 and the second phase-voltage detection unit 30 monitor the voltage level and symbol of these first phase voltage V1 and second phase voltage V2, respectively. The estimation unit 40 estimates a phase-current flow direction. The estimation unit 40 stores therein an output (a detection value) of a current sensor at the time of a change in an estimated phase-current symbol (a direction) (considered to be the moment when the current is approximately zero), and therefore can obtain a correction value corresponding to an offset value of the current sensor based on the detection value and can update the correction value with respect to the detection value of the current sensor while continuing a driving operation.

A phase current pattern in the power conversion apparatus 1 includes six types of current patterns CP1 to CP6 as shown in FIGS. 2(*a*) to 2(*f*), for example.

The current pattern CP1 is a pattern in which the switching element Q1 of the upper arm is turned on while the switching element Q2 of the lower arm is turned off, and a phase current flows out from the P line Lp via the switching element Q1 to the phase current line L (see FIG. 2(*a*)). That is, the current pattern CP1 is a pattern in which a phase current flows out from the inverter circuit 90 (see FIG. 1) to the phase current line L.

The current pattern CP2 is a pattern in which the switching element Q1 of the upper arm is turned off and the switching element Q2 of the lower arm is turned off, and a phase current flows out from the N line Ln via the freewheeling diode D2 to the phase current line L (see FIG. 2(*b*)). That is, the current pattern CP2 is a pattern in which a phase current flows out from the inverter circuit 90 (see FIG. 1) to the phase current line L.

The current pattern CP3 is a pattern in which the switching element Q1 of the upper arm is turned off while the switching element Q2 of the lower arm is turned on, and a phase current flows from the phase current line L via the switching element Q2 to the N line Ln (see FIG. 2(*c*)). That is, the current pattern CP3 is a pattern in which a phase current flows into the inverter circuit 90 from the phase current line L (see FIG. 1).

The current pattern CP4 is a pattern in which the switching element Q1 of the upper arm is turned off and the switching element Q2 of the lower arm is turned off, and a phase current flows from the phase current line L via the freewheeling diode D1 to the P line Lp (see FIG. 2(*d*)). That is, the current pattern CP4 is a pattern in which a phase current flows into the inverter circuit 90 from the phase current line L (see FIG. 1).

The current pattern CP5 is a pattern (at the time of defect occurrence) in which the switching element Q1 of the upper arm is turned on and the switching element Q2 of the lower arm is turned on, and a short-circuit current flows from the P line Lp via the switching element Q1 and the switching element Q2 to the N line Ln.

The current pattern CP6 is a pattern (the phase current is equal to 0 or at the time of defect occurrence or of stopping) in which the switching element Q1 of the upper arm is turned off and the switching element Q2 of the lower arm is turned off, and any phase current does not flow.

Furthermore, in the current patterns CP1 to CP6, a relationship between a magnitude and a symbol of the first phase voltage V1 and the second phase voltage V2, and a phase current direction is shown in a table in FIG. 3.

In the table shown in FIG. 3, Va indicates an ON-voltage of a switching element and a freewheeling diode, and Vb indicates a voltage derived by subtracting Va from a DC bus voltage. Generally, Va is equal to several voltages, Vb is equal to several hundred voltages, and the relationship between Va and Vb is expressed as Va<<Vb.

As shown in FIG. 2 and FIG. 3, when there is not any defect in the power conversion apparatus 1 while continuing a driving operation of the power conversion apparatus 1, it is conceivable that the phase current pattern in the power conversion apparatus 1 is anyone among the current patterns CP1 to CP4 (the current pattern CP5 occurs for a very short time during the driving, and therefore can be ignored). Therefore, the estimation unit 40 estimates which the phase current pattern is among the current patterns CP1 to CP4 mainly based on a magnitude and a symbol of the first phase voltage V1 and a magnitude and a symbol of the second phase voltage V2, and accordingly can estimate a direction of a phase current flowing through a phase current line.

In a case where there is a defect or a break in an output line in the power conversion apparatus 1 while continuing a driving operation of the power conversion apparatus 1, the phase current pattern in the power conversion apparatus 1 can become the current pattern CP5 (for a long time) or CP6. Therefore, in a case where the phase current pattern is estimated to be either the current pattern CP5 (for a long time) or CP6 based on a magnitude and a symbol of the first phase voltage V1 and a magnitude and a symbol of the second phase voltage V2, the estimation unit 40 can estimate that there is a defect or a break in an output line in the power conversion apparatus 1. In this case, in the power conversion apparatus 1, the occurrence of a defect or a break in an output line can be notified by a predetermined notification unit (for example, an LED lamp).

A configuration of each of the first phase-voltage detection unit 20 and the second phase-voltage detection unit 30 is explained next with reference to FIG. 4. FIG. 4(a) depicts a configuration of the first phase-voltage detection unit 20, and FIG. 4(b) depicts a configuration of the second phase-voltage detection unit 30.

In the configurations shown in FIGS. 4(a) and 4(b), a comparator is provided in each of the upper arm and the lower arm. Magnitudes and symbols of the first phase voltage V1 and the second phase voltage V2 are specified according to outputs "H" and "L" of the comparator. A phase current direction is estimated according to a combination of the magnitudes and symbols of the first phase voltage V1 and the second phase voltage V2.

Specifically, as shown in FIG. 4(a), the first phase-voltage detection unit 20 includes a comparator 21, a comparator 22, a load element 23, a clamping element 24, and a voltage generating element 25. An inverting input terminal of the comparator 21 is connected to the P line Lp. An inverting input terminal of the comparator 22 is connected to the P line Lp through the voltage generating element 25. The voltage generating element 25 generates a voltage Vc such that the potential on the inverting input terminal side of the comparator 21 is higher than the potential on the inverting input terminal side of the comparator 22. The voltage Vc is set to a value sufficiently larger than the ON-voltage Va of a switching element and a freewheeling diode (Va<Vc).

A non-inverting input terminal of the comparator 21 and a non-inverting input terminal of the comparator 22 are commonly connected to one end of the load element 23 and one end of the clamping element 24. The other end of the load element 23 is connected to the phase current line L. The other end of the clamping element 24 is connected to a predetermined clamping voltage −Vd. An absolute value (Vd) of the clamping voltage −Vd is set to be larger than the ON-voltage Va of a switching element and a freewheeling diode and smaller than a voltage Vb derived by subtracting Va from a DC bus voltage (Vc<Vd<Vb). Accordingly, the clamping element 24 clamps the potential on the non-inverting input terminal side of the comparator 21 and the comparator 22 at the clamping voltage Vd, thereby functioning as an overvoltage protection element in which an overvoltage is hardly applied to the comparator 21 and the comparator 22.

In the first phase-voltage detection unit 20 shown in FIG. 4(a), the comparator 21 and the comparator 22 perform a comparison operation, and respectively output comparison results S21 and S22.

As shown in FIG. 4(b), the second phase-voltage detection unit 30 includes a comparator 31, a comparator 32, a load element 33, a clamping element 34, and a voltage generating element 35. An inverting input terminal of the comparator 31 is connected to the N line Ln through the voltage generating element 35. An inverting input terminal of the comparator 32 is connected to the N line Ln. The voltage generating element 35 generates a voltage Vc such that the potential on the inverting input terminal side of the comparator 31 is higher than the potential on the inverting input terminal side of the comparator 32. The voltage Vc is set to a value sufficiently larger than the ON-voltage Va of a switching element and a freewheeling diode (Va<Vc).

A non-inverting input terminal of the comparator 31 and a non-inverting input terminal of the comparator 32 are commonly connected to one end of the load element 33 and one end of the clamping element 34. The other end of the load element 33 is connected to the phase current line L. The other end of the clamping element 34 is connected to a predetermined clamping voltage Vd. The clamping voltage Vd is set to be larger than the ON-voltage Va of a switching element and a freewheeling diode and smaller than the voltage Vb derived by subtracting Va from a DC bus voltage (Vc<Vd<Vb). Accordingly, the clamping element 34 clamps the potential on the non-inverting input terminal side of the comparator 31 and the comparator 32 at the clamping voltage Vd, thereby functioning as an overvoltage protection element in which an overvoltage is hardly applied to the comparator 31 and the comparator 32.

In the second phase-voltage detection unit 30 shown in FIG. 4(b), the comparator 31 and the comparator 32 perform a comparison operation, and output comparison results S31 and S32, respectively.

An operation of the estimation unit 40 is explained next with reference to FIG. 5 and FIG. 6.

The estimation unit 40 specifies a current pattern according to the comparison results S21 and S22 from the first phase-voltage detection unit 20, as shown in FIGS. 5(a) and 6(a), thereby estimating a phase current direction. In a table shown in FIG. 6(a), "X" indicates that there is not any current, and "undetermined" indicates that a current direction cannot be determined.

For example, when both the comparison results S21 and S22 are at the level "H", the symbol of the first phase voltage V1 is estimated to be positive and the magnitude thereof is estimated to be approximately the voltage Va.

Therefore, the estimation unit 40 estimates that the current pattern is CP4 (see FIG. 3). Accordingly, the estimation unit 40 estimates that the phase current direction is a direction in which the current flows into the inverter circuit 90 (see FIG. 2(d)).

As another example, when the comparison result S21 is at the level "L" and the comparison result S22 is at the level "H", the symbol of the first phase voltage V1 is estimated to be negative and the magnitude thereof is estimated to be approximately the voltage −Va. Therefore, the estimation unit 40 estimates that the current pattern is CP1 or CP5 (see FIG. 3). Accordingly, when any occurrence of a defect in the power conversion apparatus 1 is not estimated, the estimation unit 40 estimates that the phase current direction is a direction in which the current flows out from the inverter circuit 90 (see FIG. 2(*a*)).

As still another example, when both the comparison results S21 and S22 are at the level "L", the symbol of the first phase voltage V1 is estimated to be negative and the magnitude thereof is estimated to be approximately the voltage −Vb. Therefore, the estimation unit 40 estimates that the current pattern is CP2 or CP3 (see FIG. 3). Accordingly, the estimation unit 40 estimates that the phase current direction is a direction in which the current flows out from the inverter circuit 90 or a direction in which the current flows into the inverter circuit 90 (that is, the direction is "undetermined") (see FIGS. 2(*b*) and 2(*c*)).

Figure 5:
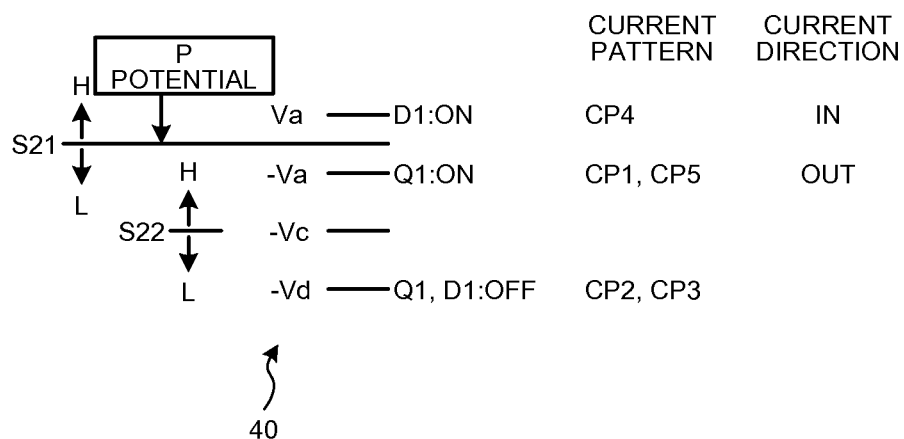
FIG. 5 depict operations of an estimation unit according to the first embodiment.
Figure 5:
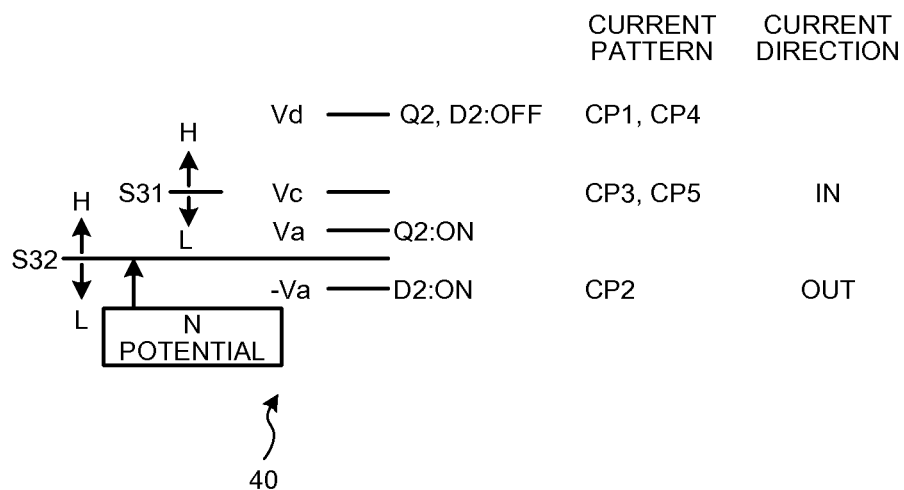
Figure 6:
FIG. 6 depict operations of the estimation unit according to the first embodiment.
Figure 6:
Figure 6:

The estimation unit 40 specifies a current pattern according to the comparison results S31 and S32 from the second phase-voltage detection unit 30, as shown in FIGS. 5(*b*) and 6(*b*), thereby estimating a phase current direction. In a table shown in FIG. 6(*b*), "x" indicates that there is not any current, and "undetermined" indicates that a current direction cannot be determined.

For example, when both the comparison results S31 and S32 are at the level "L", the symbol of the second phase voltage V2 is estimated to be negative and the magnitude thereof is estimated to be approximately the voltage −Va. Therefore, the estimation unit 40 estimates that the current pattern is CP2 (see FIG. 3). Accordingly, the estimation unit 40 estimates that the phase current direction is a direction in which the current flows out from the inverter circuit 90 (see FIG. 2(*b*)).

As another example, when the comparison result S31 is at the level "L" and the comparison result S32 is at the level "H", the symbol of the second phase voltage V2 is estimated to be positive and the magnitude thereof is estimated to be approximately the voltage Va. Therefore, the estimation unit 40 estimates that the current pattern is CP3 or CP5 (see FIG. 3). Accordingly, when any occurrence of a defect in the power conversion apparatus 1 is not estimated, the estimation unit 40 estimates that the phase current direction is a direction in which the current flows into the inverter circuit 90 (see FIG. 2(*c*)).

As still another example, when both the comparison results S31 and S32 are at the level "H", the symbol of the second phase voltage V2 is estimated to be positive and the magnitude thereof is estimated to be approximately the voltage Vb. Therefore, the estimation unit 40 estimates that the current pattern is CP1 or CP4 (see FIG. 3). Accordingly, the estimation unit 40 estimates that the phase current direction is a direction in which the current flows out from the inverter circuit 90 or a direction in which the current flows into the inverter circuit 90 (that is, the direction is "undetermined") (see FIGS. 2(*a*) and 2(*d*)).

As described above, there is a case where the phase current direction cannot be estimated by only using either the comparison results S21 and S22 from the first phase-voltage detection unit 20 or the comparison results S31 and S32 from the second phase-voltage detection unit 30. Therefore, as shown in FIG. 6(*c*), the estimation unit 40 uses both the comparison results S21 and S22 from the first phase-voltage detection unit 20 and the comparison results S31 and S32 from the second phase-voltage detection unit 30 to estimate a phase current direction.

For example, when the comparison results S21, S22, S31, and S32 are respectively at the level "HHLH", the estimation unit 40 estimates that the current pattern is CP3 or CP4 (see FIGS. 5(*a*) and 5(*b*)), thereby estimating that the phase current direction is a direction in which the current flows into the inverter circuit 90 (see FIGS. 2(*c*) and 2(*d*)).

For example, when the comparison results S21, S22, S31, and S32 are respectively at the level "HHHH", the estimation unit 40 estimates that the current pattern is CP4 (see FIGS. 5(*a*) and 5(*b*)), thereby estimating that the phase current direction is a direction in which the current flows into the inverter circuit 90 (see FIG. 2(*d*)).

For example, when the comparison results S21, S22, S31, and S32 are respectively at the level "LLLH", the estimation unit 40 estimates that the current pattern is CP3 (see FIGS. 5(*a*) and 5(*b*)), thereby estimating that the phase current direction is a direction in which the current flows into the inverter circuit 90 (see FIG. 2(*c*)).

For example, when the comparison results S21, S22, S31, and S32 are respectively at the level "LHLL", the estimation unit 40 estimates that the current pattern is CP1 or CP2 (see FIGS. 5(*a*) and 5(*b*)) if there is not any defect in the power conversion apparatus 1, thereby estimating that the phase current direction is a direction in which the current flows out from the inverter circuit 90 (see FIGS. 2(*a*) and 2(*b*)).

For example, when the comparison results S21, S22, S31, and S32 are respectively at the level "LLLL", the estimation unit 40 estimates that the current pattern is CP2 (see FIGS. 5(*a*) and 5(*b*)), thereby estimating that the phase current direction is a direction in which the current flows out from the inverter circuit 90 (see FIG. 2(*b*)).

For example, when the comparison results S21, S22, S31, and S32 are respectively at the level "LHHH", the estimation unit 40 estimates that the current pattern is CP1 (see FIGS. 5(*a*) and 5(*b*)), thereby estimating that the phase current direction is a direction in which the current flows out from the inverter circuit 90 (see FIG. 2(*a*)).

For example, when the comparison results S21, S22, S31, and S32 are respectively at the level "LHLH", the estimation unit 40 estimates that the current pattern is CP5 (see FIGS. 5(*a*) and 5(*b*)), thereby estimating that a there is a defect (short circuit) in the power conversion apparatus 1 (see FIG. 2(*e*)).

As described above, the estimation unit 40 monitors outputs (the comparison results S21, S22, S31, and S32) of the comparators 21, 22, 31, and 32, and therefore can estimate a change in the current direction ("in to out" and "out to in"). The estimation unit 40 estimates a timing at which the estimated phase-current direction is reversed as a phase-current zero-cross point timing. The estimation unit 40 supplies a signal indicating the estimated zero-cross point timing (for example, a change detection signal) to the calculation unit 50.

Figure 7:
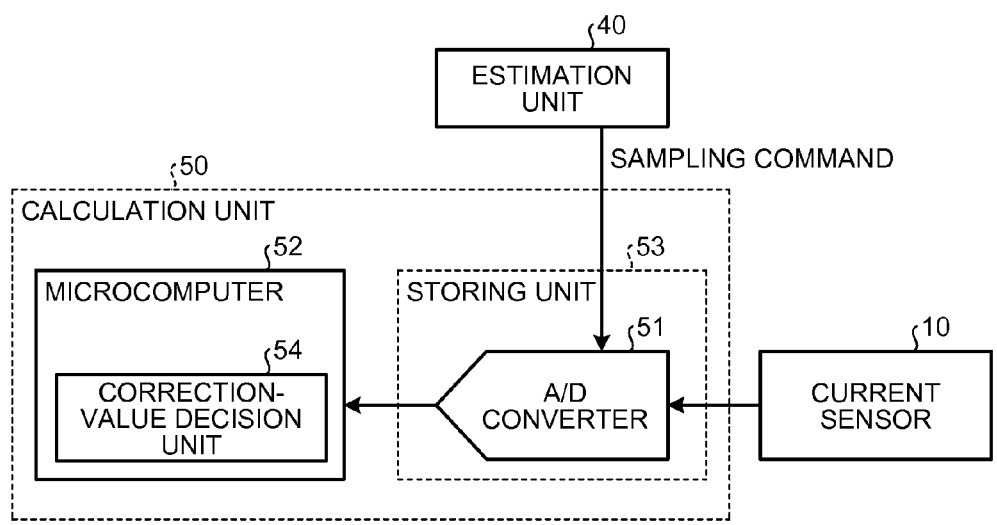
FIG. 7 depicts a configuration of a calculation unit according to the first embodiment.

A configuration of the calculation unit 50 is explained next with reference to FIG. 7. FIG. 7 depicts a configuration of the calculation unit 50.

The calculation unit 50 includes a storing unit 53 and a correction-value decision unit 54. The storing unit 53 receives a signal indicating an estimated zero-cross point timing from the estimation unit 40. The storing unit 53 stores therein a detection value of the current sensor 10 at the estimated zero-cross point timing, and supplies the detection value to the correction-value decision unit 54. For example, as shown in FIG. 7, the calculation unit 50 stores therein an output (a detection value) of the current sensor 10 through an A/D converter into a microcomputer. That is, the storing unit 53 includes an A/D converter 51. The correction-value decision unit 54 includes a part of a microcomputer 52. The A/D converter 51 can be incorporated into the microcomputer 52.

The A/D converter 51 receives a sampling command from the estimation unit 40, for example, as a signal indicating an estimated zero-cross point timing. The A/D converter 51 performs A/D conversion on a detection value (an analog signal)

of the current sensor 10 according to the sampling command, and supplies the A/D-converted detection value (a digital signal) of the current sensor 10 to the microcomputer 52. With this configuration, the storing unit 53 stores therein the detection value (the digital signal) of the current sensor 10, and supplies the stored detection value to the microcomputer 52.

As described above, when there is a current direction change, a sampling command is generated to store a detection value of the current sensor 10. Therefore, a detection value of the current sensor 10 at a current zero-cross point can be stored.

The correction-value decision unit 54 then decides the stored detection value as it is as a correction value, for example. That is, the correction-value decision unit 54 uses the stored detection value as it is to obtain a correction value. The correction-value decision unit 54 supplies the obtained correction value to the correction unit 60.

When a detection value of the current sensor 10 at a current zero-cross point is decided to be a correction value as it is as an offset value, an averaged value of detection values stored for plural times can be decided as it is as a correction value, instead of deciding a stored detection value as it is as a correction value. Alternatively, a low-pass-filtered value of stored detection values can be decided as it is as a correction value.

Figure 8:
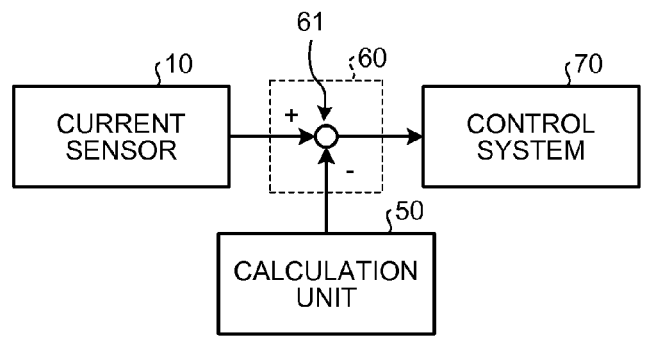
FIG. 8 depicts a configuration of a correction unit according to the first embodiment.

A configuration of the correction unit 60 is explained next with reference to FIG. 8. FIG. 8 depicts a configuration of the correction unit 60.

The correction unit 60 receives an obtained correction value, that is, an updated correction value from the calculation unit 50, and receives a detection value of the current sensor 10 from the current sensor 10. The correction unit 60 uses the updated correction value to correct the detection value of the current sensor 10 and supply the corrected detection value to the control system 70, thereby reflecting the corrected detection value to an original current detection circuit (that is, the storing unit 71) in the control system 70, for example.

Specifically, the correction unit 60 includes a subtractor 61. The subtractor 61 receives a detection value of the current sensor 10 from the current sensor 10, receives a correction value from the calculation unit 50, and subtracts the correction value from the detection value of the current sensor 10. Accordingly, the correction unit 60 can cancel out the offset amount from the detection value of the current sensor 10.

Figure 14:
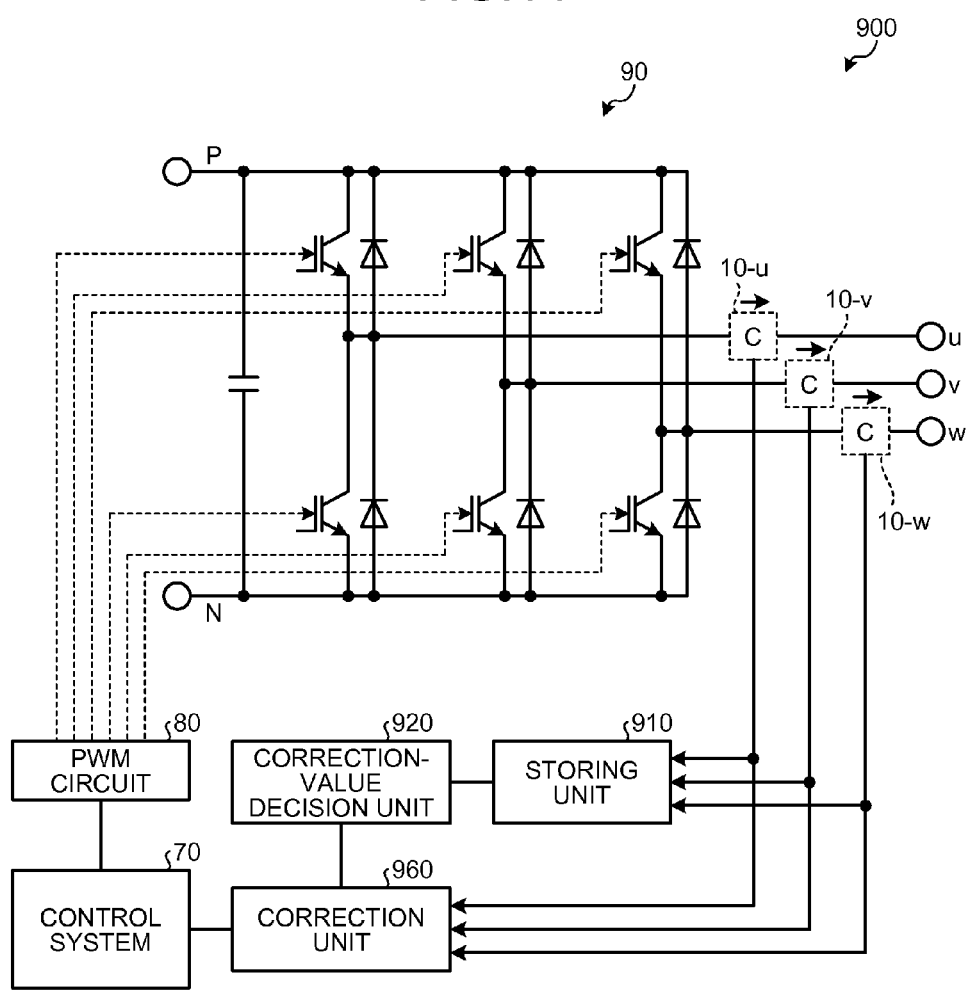
FIG. 14 depicts a configuration of a power conversion apparatus according to a comparative example.

As shown in FIG. 14, a case where an offset of the current sensor 10 is measured only when a power conversion apparatus 900 is stopped is assumed. That is, a storing unit 910 confirms that the power conversion apparatus 900 is stopped, stores therein a detection value of the current sensor 10 during a period when the power conversion apparatus 900 is stopped, and supplies the stored detection value to a correction-value decision unit 920. The correction-value decision unit 920 decides the stored detection value as it is as a correction value, and supplies the correction value to a correction unit 960. The correction unit 960 holds the supplied correction value. Thereafter, when the power conversion apparatus 900 starts its driving operation, the correction unit 960 uses the correction value held therein to correct the detection value of the current sensor 10 and supply the corrected detection value to the control system 70. That is, the correction unit 960 uses the correction value held therein as a fixed value to correct the detection value of the current sensor 10. In this case, there is a possibility that an offset of the current sensor 10 varies due to a temperature or the like during long-time continuous driving, and appropriate correction cannot be performed.

If appropriate correction cannot be performed, it is difficult to accurately detect a phase current, and it is also difficult to accurately perform a control operation in the power conversion apparatus 900 by using a detected phase current.

In contrast, in the first embodiment, in the power conversion apparatus 1, the first phase-voltage detection unit 20 detects the first phase voltage V1 in the phase current line L with a potential in the P line Lp as a reference, the second phase-voltage detection unit 30 detects the second phase voltage V2 in the phase current line L with a potential in the N line Ln as a reference, and the estimation unit 40 estimates a zero-cross point timing of a phase current flowing through the phase current line L based on a magnitude and a symbol of the first phase voltage V1 and a magnitude and a symbol of the second phase voltage V2. According to a detection value of the current sensor 10 at the estimated zero-cross point timing, the calculation unit 50 obtains a correction value with respect to the detection value of the current sensor 10. The correction unit 60 uses the obtained correction value to correct the detection value of the current sensor 10. Accordingly, a correction value corresponding to an offset of a current sensor can be obtained as needed while continuing a driving operation. That is, appropriate correction can be performed while continuing a driving operation.

Therefore, even in a case where an offset of a current sensor varies due to a temperature or the like during long-time continuous driving, correction accuracy can be constantly improved. Accordingly, a phase current can be accurately detected and a control operation in the power conversion apparatus 1 can be accurately performed by using the detected phase current.

As another example, a case where a low-cost current sensor is used as the current sensor 10 is assumed. In this case, the temperature drift of a detection value is large, and therefore there is a high possibility that an offset of the current sensor 10 varies easily due to a temperature or the like even during short-time continuous driving, and appropriate correction cannot be performed.

In contrast, in the first embodiment, a correction value corresponding to an offset of the current sensor 10 can be constantly obtained while continuing a driving operation. Therefore, even when a low-cost current sensor is used as the current sensor 10, appropriate correction can be performed while continuing a driving operation. That is, manufacturing costs of the power conversion apparatus 1 can be reduced and appropriate correction can be performed while continuing a driving operation.

In addition, in the first embodiment, the estimation unit 40 estimates a direction of a phase current flowing through the phase current line L based on a magnitude and a symbol of the first phase voltage V1 and a magnitude and a symbol of the second phase voltage V2, and estimates a timing at which the estimated phase-current direction is reversed as a phase-current zero-cross point timing. Accordingly, the phase-current zero-cross point timing can be estimated by a simple configuration.

In the first embodiment, the calculation unit 50 stores therein a detection value of the current sensor 10 at a zero-cross point timing estimated by the estimation unit 40, and uses the stored detection value to obtain a correction value. For example, in the calculation unit 50, the storing unit 53 stores therein a detection value of the current sensor 10 at the estimated zero-cross point timing, and the correction-value decision unit 54 decides the stored detection value as it is as a correction value. Accordingly, the correction value with respect to the detection value of the current sensor 10 can be obtained by a simple configuration.

Figure 9:
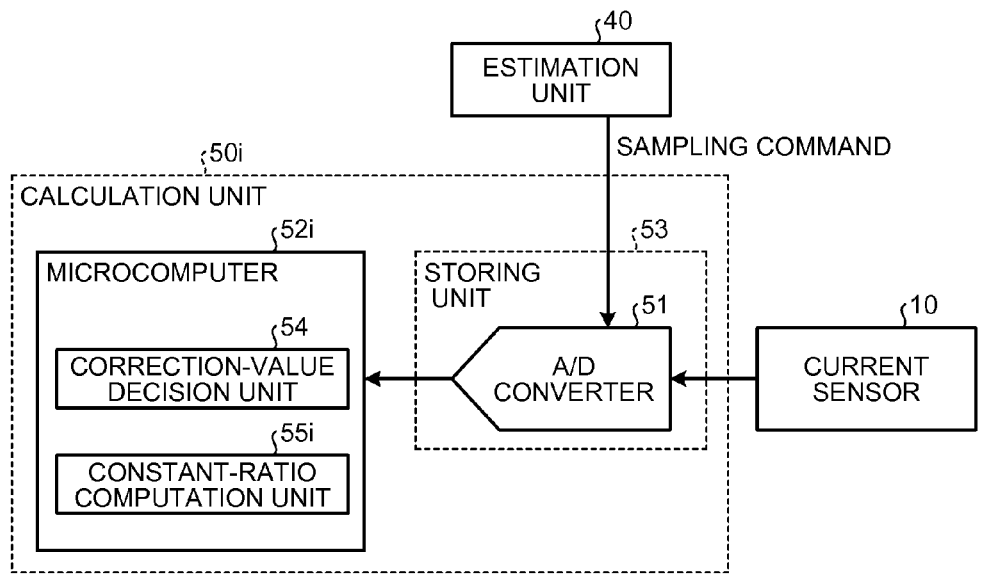
FIG. 9 depicts a configuration of a calculation unit according to a modification of the first embodiment.

As shown in FIG. 9, a calculation unit 50*i* can use a constant ratio of a stored detection value (or an averaged value or a low-pass-filtered value of stored detection values) as a correction value. In this case, the calculation unit 50*i* includes the storing unit 53, a constant-ratio computation unit 55*i*, and the correction-value decision unit 54. The storing unit 53 stores therein a detection value of the current sensor 10 at an estimated zero-cross point timing, and supplies the detection value to the constant-ratio computation unit 55*i*. The constant-ratio computation unit 55*i* multiplies the stored detection value by a constant coefficient K to obtain a value of a constant ratio of the stored detection value. The constant coefficient K is a coefficient obtained by experimentally acquiring a correlation between a detection value of the current sensor 10 at a zero-cross point timing and an offset of the current sensor 10 in advance, and has a value of, for example, larger than 0 and smaller than or equal to 1.5 (for example, a value of 0.7). The constant-ratio computation unit 55*i* supplies the obtained value to the correction-value decision unit 54. The correction-value decision unit 54 decides the obtained value, that is, a value of a constant ratio of a stored detection value as a correction value.

Accordingly, in a case where there is an error in a process of estimating a change in the current direction by the estimation unit 40 or there is an error in a process of storing a detection value of the current sensor 10 by the calculation unit 50*i*, the stored detection value can be slightly decreased and used as a correction value to avoid an overcorrection. Alternatively, the stored detection value can be slightly increased and used as a correction value to avoid an undercorrection. That is, in a case where there is an error in a process of estimating a change in the current direction by the estimation unit 40 or there is an error in a process of storing a detection value of the current sensor 10 by the calculation unit 50*i*, the correction can be performed while taking these errors into consideration. Therefore, a more appropriate correction can be performed while continuing a driving operation.

Figure 10:
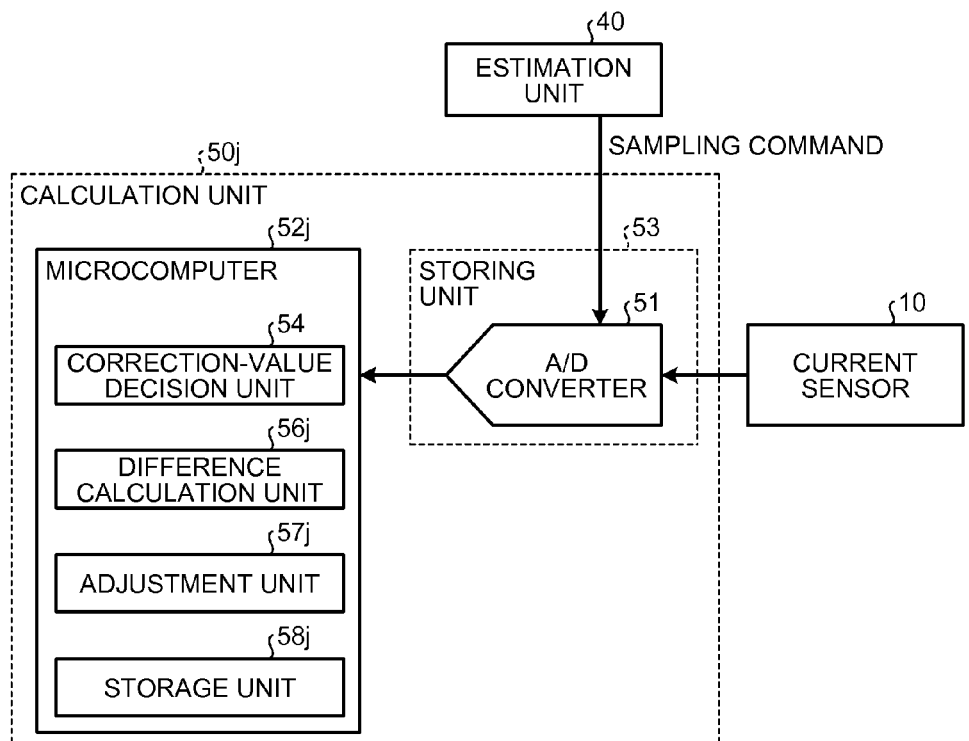
FIG. 10 depicts a configuration of the calculation unit according to the modification of the first embodiment.

Alternatively, as shown in FIG. 10, a calculation unit 50*j* can compare a correction value at the time of updating an immediately-preceding correction value with a present stored detection value (or an averaged value or a low-pass-filtered value of stored detection values) to adjust a correction amount by a constant value according to a difference between the correction value and the detection value. In this case, the calculation unit 50*j* includes the storing unit 53, a storage unit 58*j*, a difference calculation unit 56*j*, an adjustment unit 57*j*, and the correction-value decision unit 54. The storing unit 53 stores therein a detection value of the current sensor 10 at an estimated zero-cross point timing, and supplies the detection value to the difference calculation unit 56*j*. A correction value at the time of updating an immediately-preceding correction value, that is, a correction value obtained immediately before by the correction-value decision unit 54 is stored in the storage unit 58*j*. The difference calculation unit 56*j* receives the stored detection value from the storing unit 53, and then refers to the storage unit 58*j* to acquire the correction value obtained immediately before. The difference calculation unit 56*j* obtains a difference between the correction value obtained immediately before and the stored detection value. For example, the difference calculation unit 56*j* obtains the difference therebetween by subtracting the stored detection value from the correction value obtained immediately before. The difference calculation unit 56*j* supplies the obtained difference to the adjustment unit 57*j*.

According to the symbol of the obtained difference, the adjustment unit 57*j* adjusts the correction value obtained immediately before by using a constant value such that an absolute value of a difference to be obtained by the difference calculation unit 56*j* after the adjustment is smaller than the present difference (the obtained difference). The constant value is decided to be a value relatively smaller than an offset of the current sensor 10 in advance. For example, in a case where a difference is obtained by subtracting a stored detection value from a correction value obtained immediately before, the adjustment unit 57*j* subtracts the constant value from the correction value obtained immediately before when the symbol of the obtained difference is positive, and adds the constant value to the correction value obtained immediately before when the symbol of the obtained difference is negative. The adjustment unit 57*j* supplies the adjusted correction value to the correction-value decision unit 54. The correction-value decision unit 54 decides the adjusted correction value, that is, a value derived by adding or subtracting the constant value to or from the correction value obtained immediately before as a correction value.

Accordingly, in a case where there is an error in a process of computing a difference between a correction value obtained immediately before and a stored detection value by the calculation unit 50, the correction value can be adjusted gradually for plural times so as to avoid an overcorrection. That is, in a case where there is an error in a process of computing a difference between a correction value obtained immediately before and a stored detection value by the calculation unit 50, the correction can be performed taking the error into consideration. Therefore, more appropriate correction can be performed while continuing a driving operation.

Figure 11:
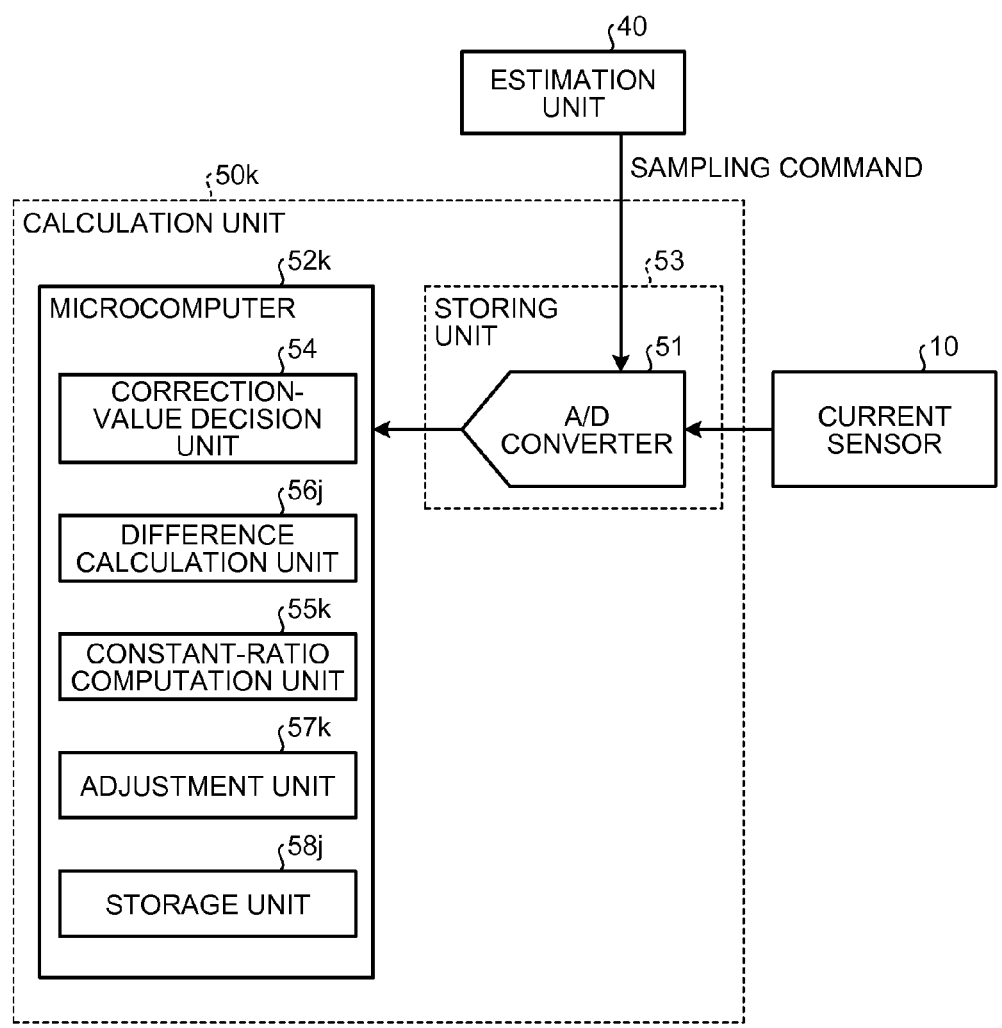
FIG. 11 depicts a configuration of the calculation unit according to the modification of the first embodiment.

Alternatively, as shown in FIG. 11, a calculation unit 50*k* can compare a correction value at the time of updating an immediately-preceding correction value with a currently stored detection value (or an averaged value or a low-pass-filtered value of stored detection values) to adjust a correction amount according to a difference between the correction value and the detection value by a value of a constant ratio of the difference. In this case, the calculation unit 50*k* includes the storing unit 53, the storage unit 58*j*, the difference calculation unit 56*j*, a constant-ratio computation unit 55*k*, an adjustment unit 57*k*, and the correction-value decision unit 54. The storing unit 53 stores therein a detection value of the current sensor 10 at an estimated zero-cross point timing, and supplies the detection value to the difference calculation unit 56*j*. A correction value at the time of updating an immediately-preceding correction value, that is, a correction value obtained immediately before by the correction-value decision unit 54 is stored in the storage unit 58*j*. The difference calculation unit 56*j* receives the stored detection value from the storing unit 53, and then refers to the storage unit 58*j* to acquire the correction value obtained immediately before. The difference calculation unit 56*j* obtains a difference between the correction value obtained immediately before and the stored detection value. For example, the difference calculation unit 56*j* obtains the difference therebetween by subtracting the stored detection value from the correction value obtained immediately before. The difference calculation unit 56*j* supplies the obtained difference to the constant-ratio computation unit 55*k* and the adjustment unit 57*k*.

The constant-ratio computation unit 55*k* multiplies the obtained difference by a constant coefficient K1 to obtain a value of a constant ratio of the obtained difference. The constant coefficient K1 is a coefficient obtained by experimentally acquiring a correlation between a difference obtained by the difference calculation unit 56*j* and an offset of the current sensor 10 in advance, and has a value of, for example, larger than 0 and smaller than 1 (for example, a value of 0.7). The constant-ratio computation unit 55k supplies the obtained value to the adjustment unit 57k.

According to the symbol of the obtained difference, the adjustment unit 57k adjusts a correction value obtained immediately before by using a value obtained by the constant-ratio computation unit 55k such that an absolute value of a difference to be obtained by the difference calculation unit 56j after the adjustment is smaller than the present difference (the obtained difference). That is, according to the symbol of the obtained difference, the adjustment unit 57k adjusts a correction value obtained immediately before by using a value of a constant ratio of the obtained difference. For example, in a case where a difference is obtained by subtracting a stored detection value from a correction value obtained immediately before, the adjustment unit 57k subtracts the value of the constant ratio of the obtained difference from the correction value obtained immediately before when the symbol of the obtained difference is positive, and adds the value of the constant ratio of the obtained difference to the correction value obtained immediately before when the symbol of the obtained difference is negative. The adjustment unit 57k supplies the adjusted correction value to the correction-value decision unit 54. The correction-value decision unit 54 decides the adjusted correction value, that is, a value derived by adding or subtracting the value of the constant ratio of the obtained difference to or from the correction value obtained immediately before as a correction value.

Accordingly, in a case where there is an error in a process of computing a difference between a correction value obtained immediately before and a stored detection value by the calculation unit 50, the correction value can be adjusted gradually for plural times so as to avoid an overcorrection while adjustment accuracy is improved gradually as the obtained difference becomes smaller. That is, in a case where there is an error in a process of computing a difference between a correction value obtained immediately before and a stored detection value by the calculation unit 50, correction can be performed taking both the error and the adjustment accuracy into consideration. Therefore, a more appropriate correction can be performed while continuing a driving operation.

Second Embodiment

Figure 12:
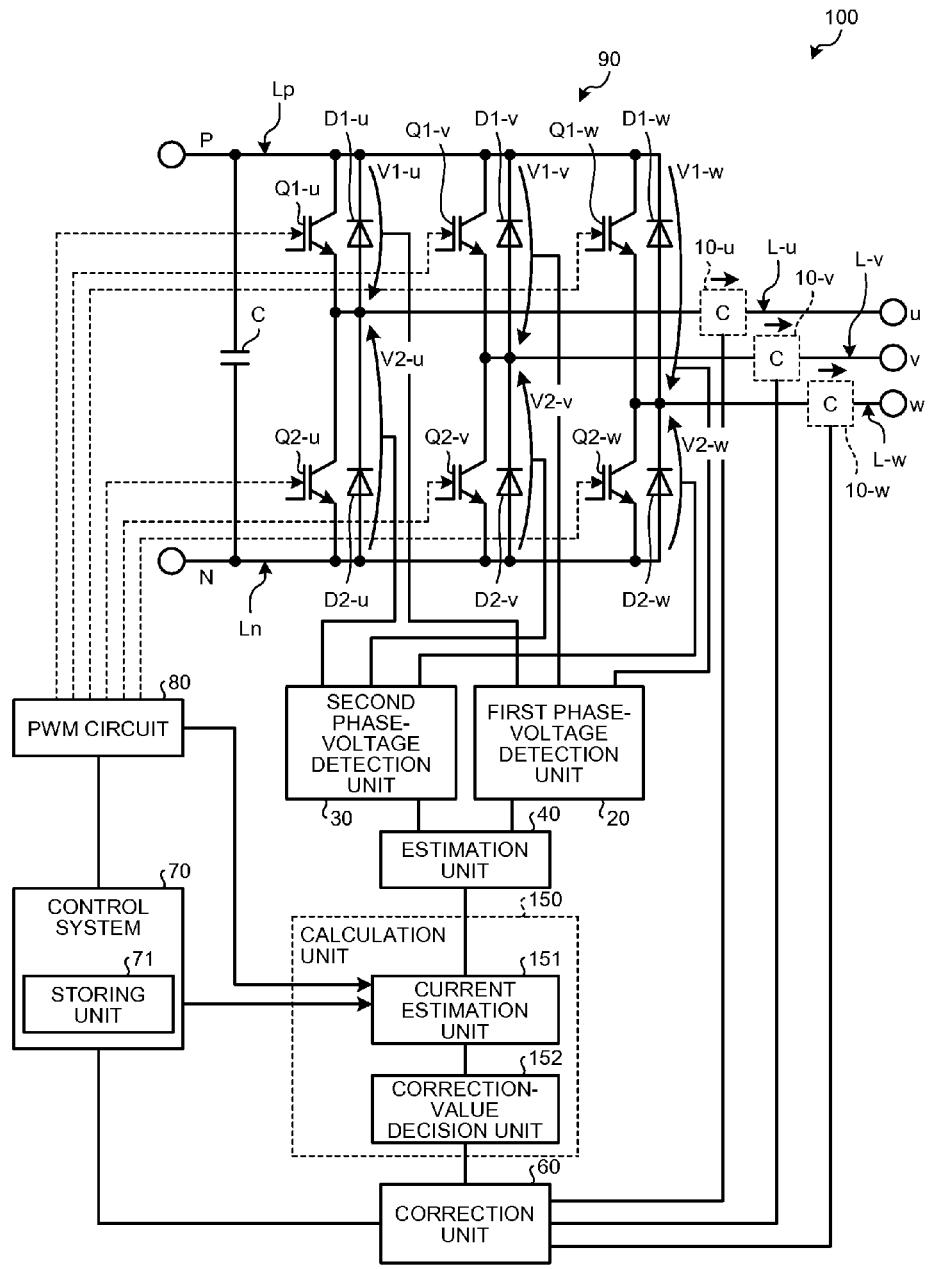
FIG. 12 depicts a configuration of a power conversion apparatus according to a second embodiment.

A power conversion apparatus 100 according to a second embodiment is explained next with reference to FIG. 12. Features different from the first embodiment are mainly explained below.

In the first embodiment, in the calculation unit 50, a dedicated current detection circuit, that is, the A/D converter 51 (see FIG. 7) in the storing unit 53 or the like is required for sampling a detection value of the current sensor 10 at a phase-current zero-cross point. However, there is a case where a dedicated A/D converter or the like cannot be prepared in an actual apparatus due to the cost or other restraints.

Therefore, in the second embodiment, under such restrained conditions, a detection value of a current sensor at an estimated zero-cross point timing is estimated, thereby obtaining a detection value of the current sensor 10 at the phase-current zero-cross point in a simulated manner.

Specifically, the power conversion apparatus 100 includes a calculation unit 150. A function of estimating a detection value of the current sensor 10 is added to the calculation unit 150, thereby omitting the storing unit 53 such as the dedicated A/D converter. That is, the calculation unit 150 includes a current estimation unit 151 and a correction-value decision unit 152.

Figure 13:
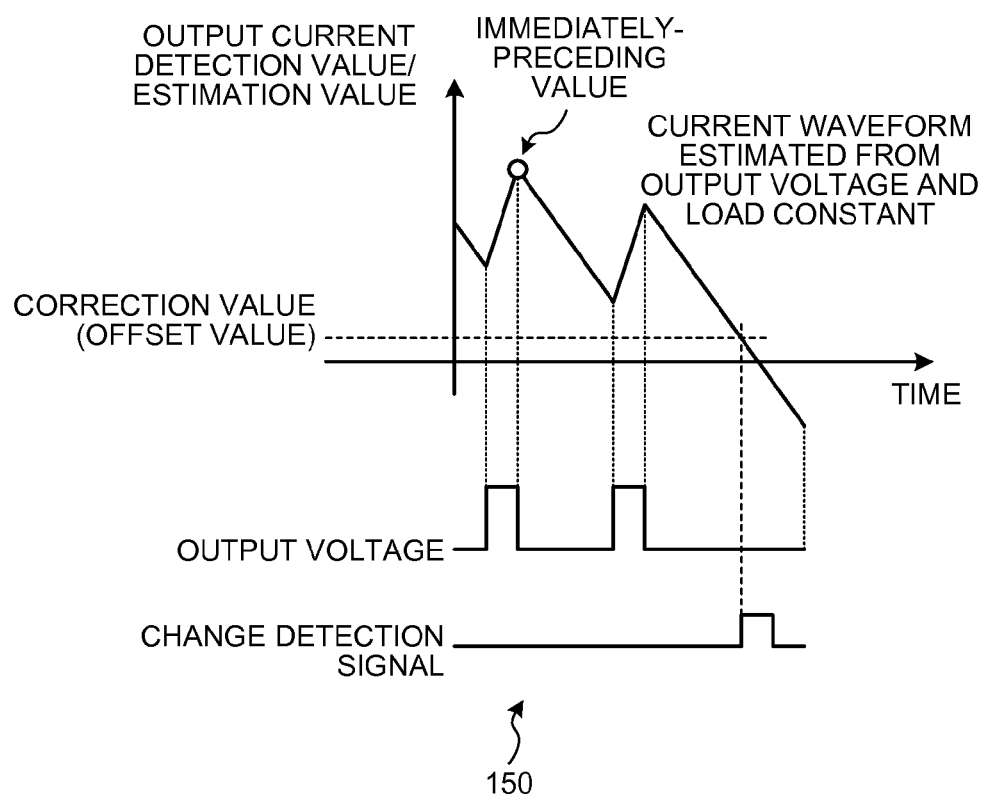
FIG. 13 depicts an operation of a calculation unit according to the second embodiment.

As shown in FIG. 13, the current estimation unit 151 estimates a change in a phase current based on a detection value obtained from an original current detection circuit (the storing unit 71) used in the control system 70, a voltage output from the control system 70, load conditions, a control state, and the like.

Specifically, the current estimation unit 151 receives a detection value of the current sensor 10, which is stored by the storing unit 71, from the control system 70. The current estimation unit 151 plots the stored detection value of the current sensor 10 on an output current-time plane shown in FIG. 13 as an "immediately-preceding value". In addition, the current estimation unit 151 receives information such as a voltage output from the control system 70, load conditions, a control state, and the like from the control system 70. The current estimation unit 151 estimates the gradient of the change in the phase current according to the information. Further, the current estimation unit 151 receives a PWM signal from the PWM circuit 80. The current estimation unit 151 estimates a time when the symbol of the gradient of the change in the phase current changes based on the PWM signal. The current estimation unit 151 estimates a waveform of the change in the phase current as shown in FIG. 13 based on the estimation results, and estimates a present detection value of the current sensor 10 according to a lapse of time as needed. The current estimation unit 151 then receives a signal indicating an estimated zero-cross point timing (for example, a change detection signal), and then supplies a detection value of the current sensor 10, which is estimated at the estimated zero-cross point timing, to the correction-value decision unit 152. That is, the current estimation unit 151 estimates a detection value of a current sensor at an estimated zero-cross point timing, and supplies the estimated detection value to the correction-value decision unit 152.

The correction-value decision unit 152 uses the estimated detection value to obtain a correction value. For example, the correction-value decision unit 152 uses the estimated detection value as it is to obtain a correction value. The correction-value decision unit 152 supplies the obtained correction value to the correction unit 60.

As described above, in the second embodiment, the calculation unit 150 estimates a change in a current, based on an immediately-preceding current detection value, from its subsequent output voltage and load conditions, and utilizes an estimation value of the current as a correction value when a signal indicating a zero-cross point timing (for example, a change detection signal) is input. With this configuration, even in a case where there is no dedicated current detection circuit (for example, a dedicated A/D converter), a correction value with respect to a detection value of a current sensor can be updated. That is, an offset correction can be achieved by using an original current detection circuit (the storing unit 71) used in the control system 70 also as a current detection circuit for offset correction without preparing any dedicated current detection circuit (the storing unit 53) for offset correction.

INDUSTRIAL APPLICABILITY

As described above, the power conversion apparatus according to the present invention is useful to correct a detection value of a current sensor.

REFERENCE SIGNS LIST 1 power conversion apparatus
10 current sensor 20 first phase-voltage detection unit
21 comparator
22 comparator
23 load element
24 clamping element
25 voltage generating element
30 second phase-voltage detection unit
31 comparator
32 comparator
33 load element
34 clamping element
35 voltage generating element
40 estimation unit
50, 50$i$, 50$j$, 50$k$ calculation unit
51 A/D converter
52, 52$i$, 52$j$, 52$k$ microcomputer
53 storing unit
54 correction-value decision unit
55$i$ constant-ratio computation unit
56$j$ difference calculation unit
57$j$, 57$k$ adjustment unit
58$j$ storage unit
60 correction unit
61 subtractor
70 control system
71 storing unit
80 PWM circuit
90 inverter circuit
100 power conversion apparatus
150 calculation unit
151 current estimation unit
152 correction-value decision unit
900 power conversion apparatus
910 storing unit
920 correction-value decision unit
960 correction unit

The invention claimed is:

1. A power conversion apparatus comprising:
a current sensor that detects a phase current flowing through a phase current line;
a first phase-voltage detection unit that detects a first phase voltage in the phase current line with a potential in a P line as a reference;
a second phase-voltage detection unit that detects a second phase voltage in the phase current line with a potential in an N line as a reference;
an estimation unit that estimates a zero-cross point timing of a phase current flowing through the phase current line based on a magnitude and a symbol of the first phase voltage and a magnitude and a symbol of the second phase voltage;
a calculation unit that obtains a correction value with respect to a detection value of the current sensor according to a detection value of the current sensor at the estimated zero-cross point timing; and
a correction unit that corrects a detection value of the current sensor by using the obtained correction value.

2. The power conversion apparatus according to claim 1, wherein the estimation unit estimates a direction of the phase current flowing through the phase current line based on the magnitude and the symbol of the first phase voltage and the magnitude and the symbol of the second phase voltage, and estimates a timing at which an estimated direction of the phase current is reversed as the zero-cross point timing.

3. The power conversion apparatus according to claim 1, wherein the calculation unit stores therein a detection value of the current sensor at the estimated zero-cross point timing, and uses a stored detection value to obtain the correction value.

4. The power conversion apparatus according to claim 3, wherein
the calculation unit includes
a difference calculation unit that obtains a difference between a correction value obtained immediately before and the stored detection value, and
an adjustment unit that adjusts the correction value obtained immediately before, according to a symbol of the difference obtained by the difference calculation unit, by using a value of a constant ratio of the obtained difference.

5. The power conversion apparatus according to claim 3, wherein the calculation unit uses the stored detection value as it is to obtain the correction value.

6. The power conversion apparatus according to claim 3, wherein the calculation unit uses a value of a constant ratio of the stored detection value to obtain the correction value.

7. The power conversion apparatus according to claim 3, wherein
the calculation unit includes
a difference calculation unit that obtains a difference between a correction value obtained immediately before and the stored detection value, and
an adjustment unit that adjusts the correction value obtained immediately before by using a constant value according to a symbol of the difference obtained by the difference calculation unit.

8. The power conversion apparatus according to claim 1, wherein the calculation unit estimates a detection value of the current sensor at the estimated zero-cross point timing, and uses an estimated detection value to obtain the correction value.

* * * * *